United States Patent [19]
Martin et al.

[11] Patent Number: 5,836,719
[45] Date of Patent: Nov. 17, 1998

[54] PIPE LAYING VESSEL AND METHOD

[75] Inventors: Robert George Martin, Oldmeldrum; Donald Carmichael; Stephen John Roberts, both of Aberdeen, all of United Kingdom

[73] Assignee: Coflexip Stena Offshore Limited, United Kingdom

[21] Appl. No.: 704,698

[22] PCT Filed: Mar. 16, 1995

[86] PCT No.: PCT/GB95/00574

§ 371 Date: Nov. 26, 1996

§ 102(e) Date: Nov. 26, 1996

[87] PCT Pub. No.: WO95/25238

PCT Pub. Date: Sep. 21, 1995

[30] Foreign Application Priority Data

Mar. 16, 1994 [GB] United Kingdom .................... 9405067
Jun. 10, 1994 [GB] United Kingdom .................... 9411702

[51] Int. Cl.⁶ ...................................................... F16L 1/00
[52] U.S. Cl. ............................................. 405/166; 405/158
[58] Field of Search .............................. 405/168.1, 168.2, 405/168.3, 168.4, 166, 167, 169, 170, 158

[56] References Cited

U.S. PATENT DOCUMENTS

| Re. 30,846 | 1/1982 | Lang et al. ......................... 405/168.4 |
| 1,569,764 | 1/1926 | Lockwood . |
| 2,215,460 | 9/1940 | Childress . |
| 3,581,506 | 6/1971 | Howard . |
| 3,854,297 | 12/1974 | Broussard et al. ...................... 405/167 |
| 3,901,043 | 8/1975 | Silvestri et al. ........................ 405/167 |
| 4,073,156 | 2/1978 | Smith . |
| 4,143,801 | 3/1979 | Sargent . |
| 4,269,540 | 5/1981 | Uyeda et al. ........................ 405/168.4 |
| 4,992,001 | 2/1991 | Harrison . |
| 5,348,423 | 9/1994 | Maloberti et al. ................... 405/168.4 |

FOREIGN PATENT DOCUMENTS

| 0090672 | 10/1983 | European Pat. Off. . |
| 2269878 | 2/1994 | United Kingdom . |
| 9115699 | 10/1991 | WIPO . |

*Primary Examiner*—Tamara L. Graysay
*Assistant Examiner*—Frederick L. Lagman
*Attorney, Agent, or Firm*—Ostrolenk, Faber, Gerb & Soffen, LLP

[57] ABSTRACT

Methods and apparatus for laying marine pipelines of the type in which the pipeline is assembled along a horizontal axis on board a pipe laying vessel prior to being launched therefrom; in which the pipeline is plastically bent to a desired launch angle and, in most cases, at least partially straightened thereafter. In preferred embodiments, the pipeline is bent through an angle greater than 90°. In the most preferred embodiments, the pipeline is diverted, initially upwardly, through an angle of substantially 180° sheave (28), prior to being bent downwards to the desired launch angle by an adjustable angle ramp (30). Other variations are also described.

25 Claims, 4 Drawing Sheets

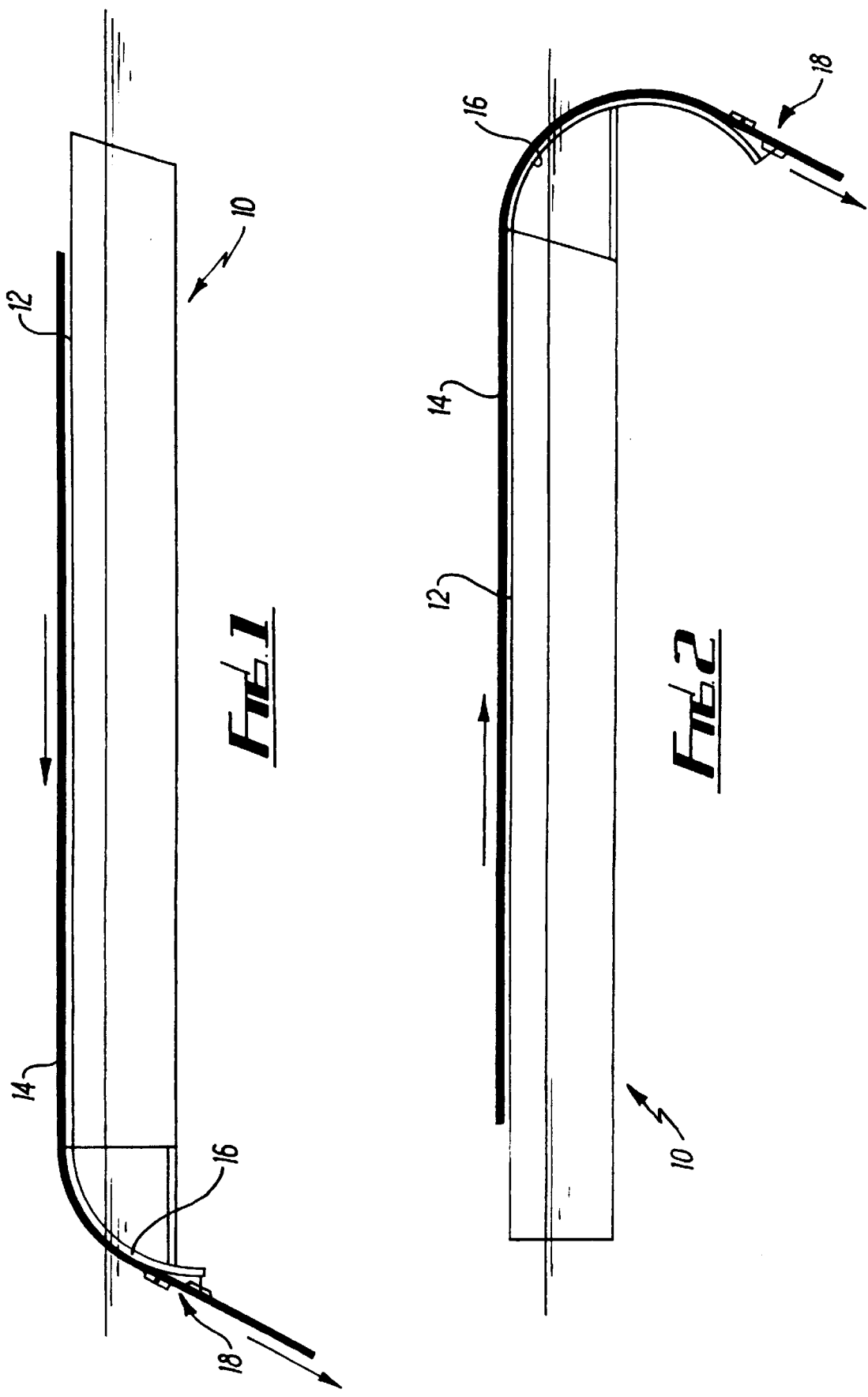

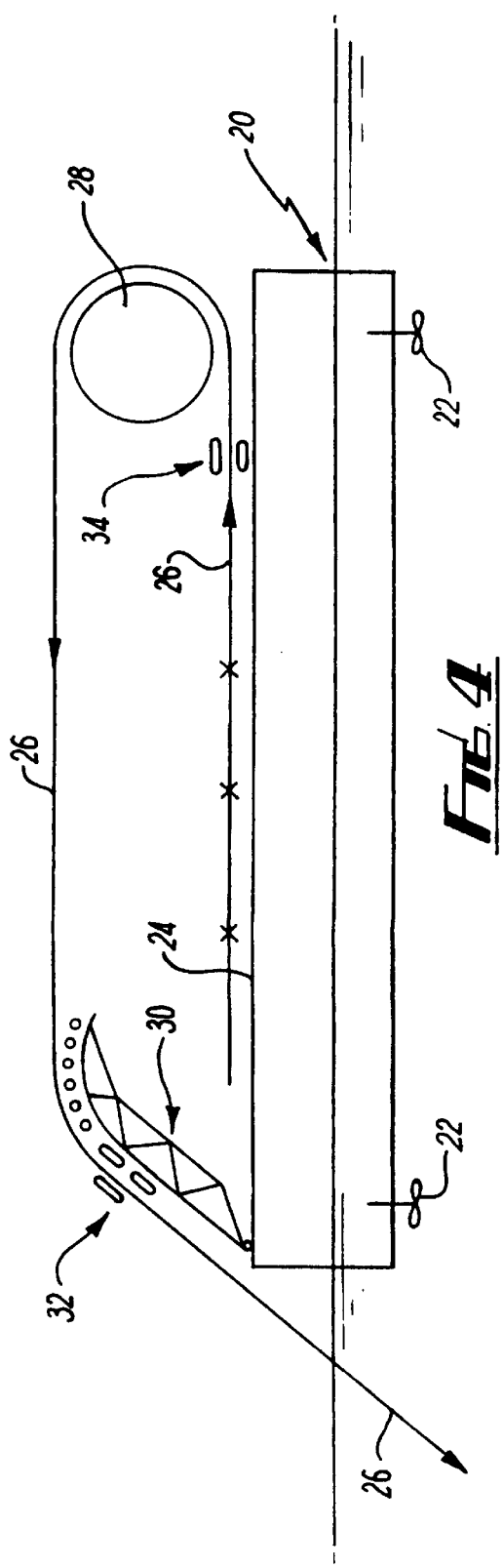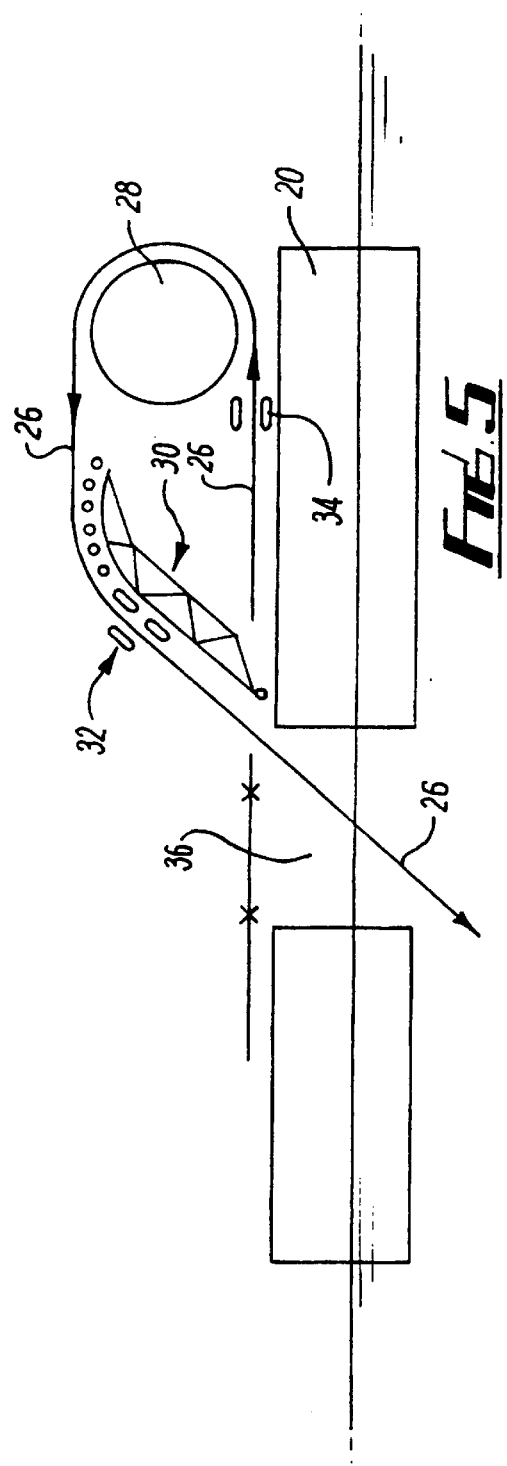

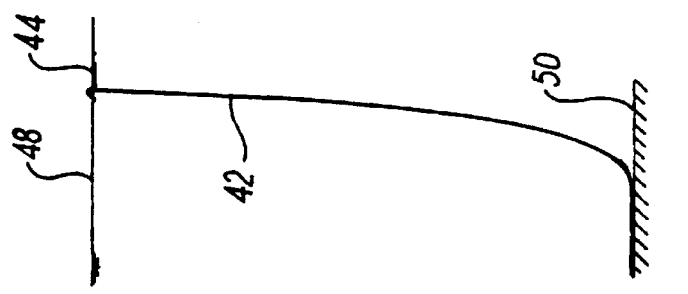
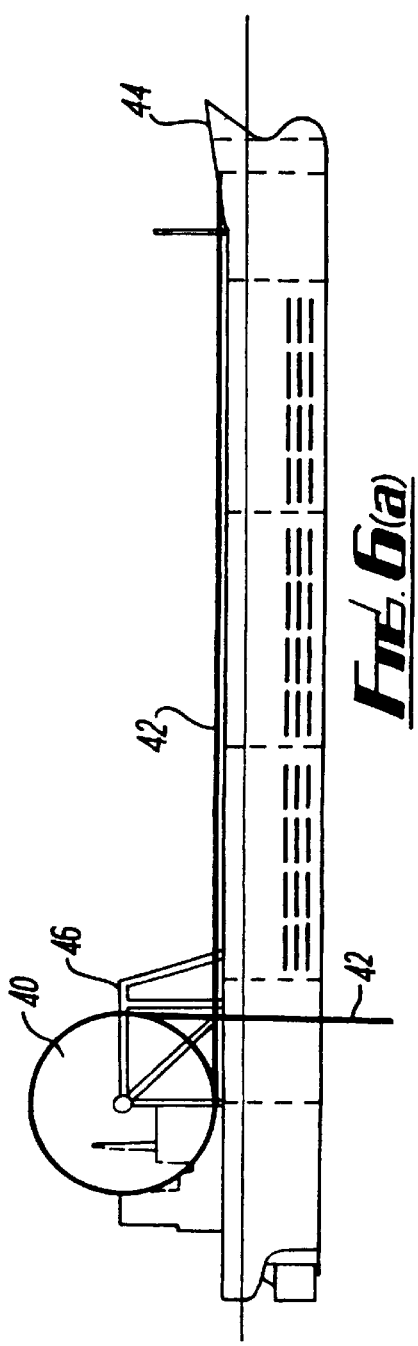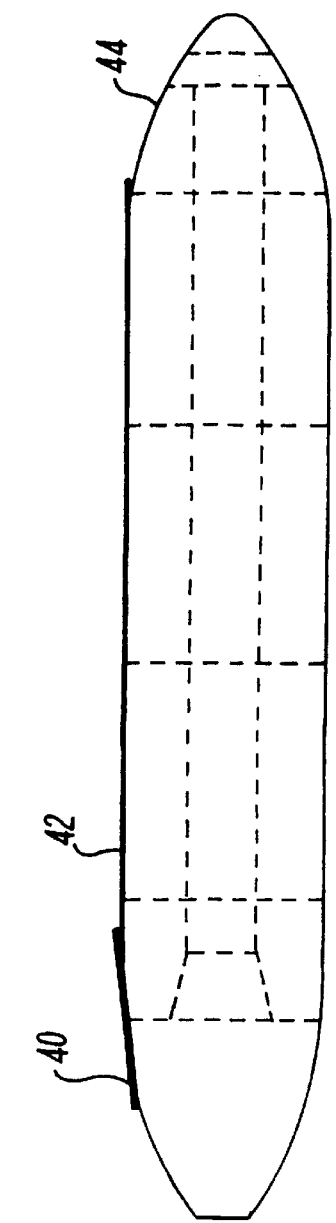

PIPE LAYING VESSEL AND METHOD

This invention relates to the laying of submarine pipelines.

Known methods of submarine pipelaying fall into two broad classes.

First, there are methods in which pipe lengths are shipped on a vessel such as a lay barge and are welded end to end as laying proceeds. These can be divided into "S lay" where the pipe is welded up in a horizontal path and laid over a stinger, and "J lay" where the pipe is launched from the vessel in a substantially vertical direction and each succeeding pipe length must be erected into a substantially vertical position for welding to the last section.

Each of these has problems and limitations. S lay requires a cumbersome and expensive stinger and can operate only in relatively shallow water. J lay can cope with deeper water, but handling pipe lengths into the vertical and welding them in that position is difficult and time consuming.

The second broad category of known method is reel pipelaying. This has the great benefit of allowing the bulk of the welding to be carried out in factory conditions ashore. However, a complex, specialised lay vessel is required for larger diameter pipelines. Reel pipelaying using existing arrangements is generally preferable on economic grounds for pipelines having an o.d. of 16" or less. However, this is not an absolute limit and may vary depending upon detailed operational requirements.

It should be noted that in the first of the foregoing categories, persons in the art have always considered it important to avoid plastic deformation of the pipe, seeking to control the double bends of S lay and the single bend of J lay such that the elastic limit of the pipe material is not exceeded. In reel pipelaying, the act of reeling solid pipe requires plastic deformation which is subsequently reversed by a straightener assembly.

An object of the present invention is to provide methods of, and vessels for, laying underwater pipelines which do not fall into the foregoing categories. The invention is particularly, but not exclusively, applicable to the laying of large diameter pipe which it is not practicable to coil on a reel and which must therefore be welded on the lay vessel.

Accordingly, from one aspect the present invention provides a method of laying an underwater pipeline, comprising welding pipe sections together along a substantially horizontal axis on the deck of a vessel to form a pipeline and laying the pipeline onto the sea bed as welding progresses, the pipeline being bent as it is laid from the vessel.

Preferably, the bending of the pipeline is followed by straightening thereof.

Preferably also, the pipeline is launched at a substantial angle to the horizontal, said angle being selected to allow the pipeline to form a catenary curve between the launch point and the sea bed.

Preferably, tension is applied to the pipeline and is controlled to ensure that the bending of the pipeline at the point where it meets the sea bed is within the elastic yield limit of the pipe material.

In certain embodiments, the pipeline is diverted about a horizontal axis through substantially 180° prior to being launched via an adjustable-angle ramp, either from the stern of the vessel or through a moon-pool.

In a further embodiment, the pipeline is diverted about a horizontal axis through substantially 270° prior to being launched substantially vertically from the side of the vessel.

From another aspect the invention provides a vessel for use in laying an underwater pipeline, the vessel including a deck area, means on the deck area for aligning pipe sections along a substantially horizontal axis and welding them together to form a pipeline, and means for bending the pipeline to cause it to pass from said horizontal axis to a launch axis having a substantial inclination to the horizontal.

Preferably, straightening means are provided downstream of said bending means for removing the bend in the pipeline.

In one form of the invention, the bending means comprises a fixed curved ramp secured to the hull of the vessel, and the straightening means (if any) is attached to the downstream end of said ramp. The ramp may be secured to extend from the stern or bow of the vessel to form a curved axis starting in alignment with said horizontal axis and ending substantially vertical at an underwater location.

In another form of the invention, the bending means comprises a sheave mounted above the deck area around which the pipe is bent through approximately 180° and an angled ramp above the deck area down which the pipeline is launched. The straightening means may suitably be mounted on the ramp. The ramp is preferably pivoted to the deck of the vessel and provided with means for adjusting its angle of inclination thereto.

The ramp may be pivoted to a location at the stern of the vessel to launch the pipeline over the stern, or may be mounted at a midships location to launch the pipeline through a moonpool in the vessel's hull.

In still another form of the invention, the bending means comprises a sheave mounted above the deck area at one side thereof around which the pipe is bent through approximately 270° prior to the pipeline being launched substantially vertically. The straightening means may suitably be mounted adjacent the sheave.

Embodiments of the present invention will now be described, by way of example only, with reference to the accompanying drawings, in which:

FIG. 1 is a schematic side view of a vessel forming one embodiment of the invention;

FIGS. 2–5 are similar views each illustrating a further embodiment;

Figure 3:
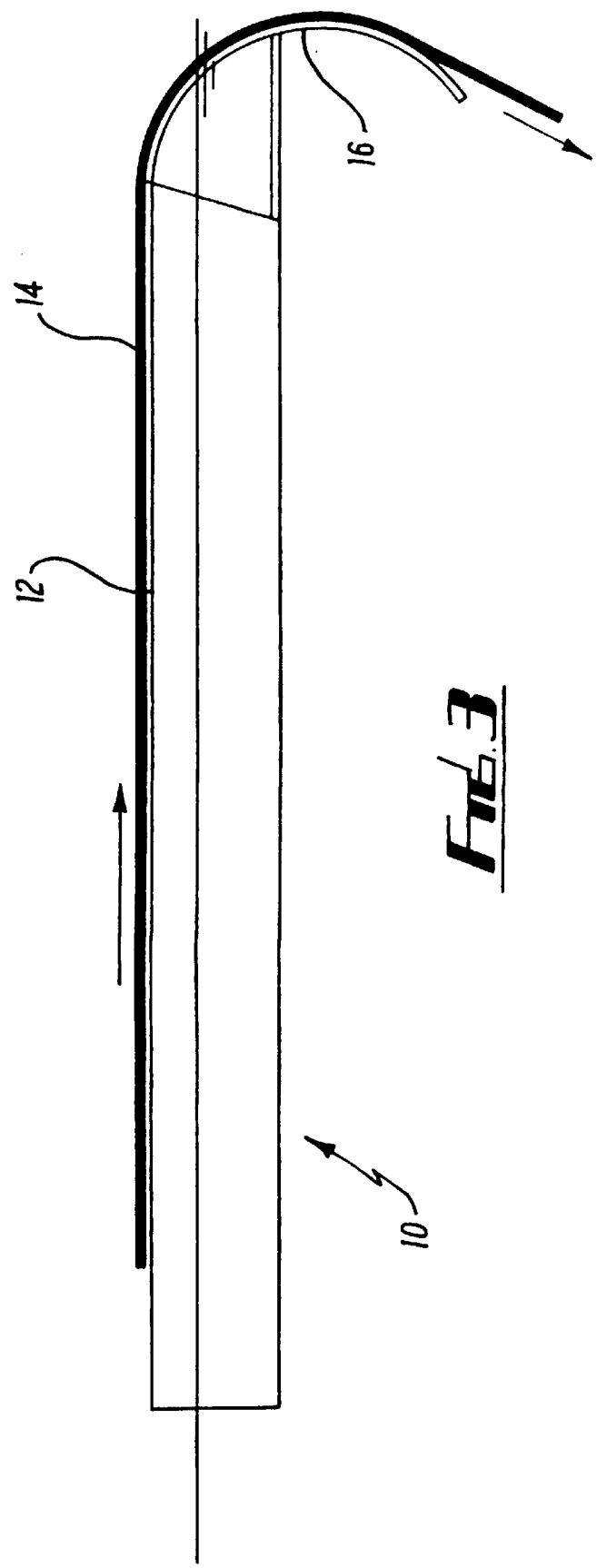

FIGS. 6(a) and 6(b) are, respectively, schematic side and plan views illustrating still another embodiment;

FIG. 7 is a schematic side view illustrating the pipeline catenary between the vessel and the seabed for the embodiment of FIGS. 6(a) and 6(b);

Referring to FIG. 1, a vessel 10 has a deck area 12 on which pipe sections are assembled and welded together along a horizontal assembly axis by methods well known per se to form a pipeline 14. The pipeline 14 is paid out to the sea bed at the stern of the vessel 10 by being passed over an aligner ramp 16 which is a relatively short, substantially arcuate structure. This avoids the need for a long stinger and allows the pipeline 14 to be aligned to an acute angle suitable for laying into deep water, while at the same time causing plastic yielding of the pipe.

A straightener assembly 18 is provided at the downstream end of the aligner ramp 16 for imparting reverse bending forces to the pipeline and thus removing the bend imparted by passage over the aligner ramp 16. Suitable forms of straightener are discussed in greater detail below. The straightener assembly 18 may also act as a tensioner for controlling the tension applied to the catenary section of the pipeline between the vessel 10 and the seabed.

The embodiment of FIG. 2 is similar to that of FIG. 1, but the pipe 14 is assembled in the forward direction of the ship and is launched over the bow. This involves a substantial projection at the bow, but has the advantage that existing vessels with aft superstructure can be utilised with a minimum of modification. Redundant oil tankers are an example of suitable aft-superstructure ships, having large deck areas and being capable of carrying large quantities of pipe. It should be noted that, although not shown in FIG. 2, such vessels normally have a bulbous bow form which provides a useful support structure for the aligner ramp 16 and straightener assembly 18.

FIG. 3 shows a vessel which is similar to that of FIG. 2 with the straightener assembly 18 omitted. It is contemplated that it would normally be desirable for the pipeline 14 to be straightened after being bent over the aligner ramp 16. However, the use of over-bow launching makes it possible to consider the omission of the straightening step. This is because the curvature imparted to the pipeline 14 is such that the pipe when laid will tend to bend down into the sea bed rather than upwardly away from it, which may indeed be useful in urging the pipe into contact with hollows in the sea bed.

Turning to FIG. 4, a self-propelled lay barge 20, propelled and positioned by vectoring thrusters indicated at 22, has a deck area 24 on which pipe sections are welded along a horizontal axis to form a pipeline 26. The direction of the pipeline 26 is then reversed by bending it around a sheave 28, and the pipeline 26 is then launched from the vessel over a ramp assembly 30 which includes a straightener 32. A tensioner 34 is provided at a point immediately before the pipeline 26 passes from the deck area 24 to the sheave 28, to control both the bending of the pipe around the sheave and the laying tension.

The ramp assembly 30 is pivotally mounted to the deck of the vessel 20 and is provided with elevating means (not shown) for adjusting its vertical angle to suit the depth of water in which the pipeline 26 is being laid.

The ramp assembly 30 is similar to that used in the reel pipelay vessel "Apache" as described for example in U.S. Pat. Nos. 4,230,421, 4,269,540, 4,297,054, 4,340,322 and 4,345,855.

The straightener 32 (and the straightener assembly 18 of FIGS. 1 and 2) comprises a three-point straightener, preferably a roller assembly of a type which is known in the art. Three-point straightening of pipelines is discussed in U.S. Pat. Nos. 3,237,438 and 3,372,461. Examples of roller-type straighteners of the generally preferred type, and their operation, are described in the above referenced U.S. Pat. Nos. 3,855,835, 4,157,023, 4,243,345 and 4,260,287. Alternative "roller-track" type assemblies are also described in above referenced U.S. Pat. Nos. 4,230,421, 4,269,540, 4,297,054, 4,340,322 and 4,345,855, and further in U.S. Pat. Nos. 3,641,778, 3,680,342, Re 30,846 and 4,723,874. In the case of the straightener assembly 18 of FIGS. 1 and 2 the aligner 16 acts as one of the three reaction points required for pipeline straightening. In each case the roller-tracks are arranged on opposite sides of the pipe, and means are provided for positioning the tracks to impart a reverse bending force.

The tensioner 34 may suitably comprise two similar tracks engaging the pipe and means, such as hydraulic motors, for causing the tracks to apply a braking force to the pipe.

The sheave 28 may be constructed and supported in a manner similar to the reel of a reel ship, but can be of relatively light weight construction since it does not have to carry the static load of a cargo of pipe.

FIG. 5 shows a modified form of the vessel 20 of FIG. 4. The pipeline 28 is launched from the vessel through a moonpool 36, rather than over the stern. This makes it possible to have the launch point adjacent the centre of the vessel, and thus to minimise the effects of vessel motion on the laying operation.

FIGS. 6(a) and 6(b) show still another embodiment of the invention. This embodiment is particularly suited to deepwater operations, and includes a sheave, wheel or equivalent structure 40 for diverting the pipeline 42 through substantially 270° or more from the horizontal so as to enter the water substantially vertically or at some required angle. The wheel 40 might have a diameter of approximately 50 meters and is rotatably mounted adjacent one side of the vessel 44 on a support structure 46.

The structure 46 may also support straightening means (not shown, suitably of any of the types previously discussed) for straightening the pipeline 42 as it leaves the wheel 40, and abandonment and recovery (A & R) equipment (ie pipeline clamps and winches and the like), as is well known in the art. For very high pipeline tensions, A & R operations may involve the use of a drill string (rather than a cable), which may be deployed from a short derrick disposed above the pipeline departure point.

Since the pipeline leaving the wheel 40 must cross the horizontal path of the pipeline being fed onto the wheel, the plane of the wheel 40 is set at a slight angle to the horizontal pipeline path and the horizontal pipeline path is curved slightly as it approaches the wheel rim, as is best seen in FIG. 6(b). This diversion of the pipeline path to allow the pipe to cross itself is advantageously carried out at the entry of the pipe to the wheel rather than after its departure therefrom, since the required curvature of the pipe can be controlled using a horizontal track on the deck of the vessel, and the lower pipeline tension before feeding around the wheel allows tighter curvature.

This embodiment is suited to the application of high pipeline tensions, required for deepwater laying, without resort to expensive track-type tensioners, by means of: first and second fixed pipeline clamps (not shown) before and after the wheel 40 on the horizontal and vertical pipeline paths respectively; a horizontal moving clamp (not shown) located before the first fixed clamp, for lowering the pipeline joint by joint; and by driving the wheel. With a correctly profiled wheel rim, the wheel can be made to transmit the full lay tension required. However, in practice a degree of back tension would always be maintained. Possible alternative strategies for applying the required tension will be discussed further below.

FIG. 7 illustrates a typical profile of the catenary curve of a pipeline extending between the vessel 44 at the surface 48 and the seabed 50. This embodiment is also suited to the use of an adapted tanker as the lay vessel, having a very large clear deck area for the assembly of pipe stalks and large capacity for the storage of pipe joints below decks.

The wheel 40 might be replaced by other means defining the required arcuate pipeline path, such as a static structure having rollers or an endless belt conveyor for supporting the pipeline as it is diverted through the required angle. This also applies to the sheave 28 of FIGS. 4 and 5.

The pipelay vessels described herein are also suitable for the laying of flexible pipelines and small diameter pipelines which may be diverted through the various embodiments of arcuate paths without plastic deformation.

It will be understood that all of the embodiments of the invention described herein might also be applied to pipelines fabricated by methods other than welding; for example, screw-threaded connection systems.

The invention thus makes it possible to conduct the pipe welding operation horizontally on the deck of a vessel while avoiding the limitations of prior art S-lay vessels, and with higher through-put than known J-lay systems.

Modifications may be made to the foregoing embodiments within the scope of the present invention.

We claim:

1. A method of laying an underwater pipeline, comprising assembling pipe sections together along a substantially horizontal axis on the deck of a vessel to form a pipeline and laying the pipeline onto the sea bed as pipeline assembly progresses, bending the pipeline as it is laid from the vessel, wherein the bending of the pipeline includes diverting the pipeline upwardly along a substantially arcuate path and subsequently diverting the pipeline downwardly to a final launch angle and launching the pipeline from the vessel.

2. The method of claim 1, wherein the pipeline is plastically bent about a substantially arcuate path in a substantially vertical plane, and wherein the bending of the pipeline is followed by straightening thereof.

3. The method of claim 2, wherein the pipeline is bent through an angle greater than 90°.

4. The method of claim 1, wherein the pipeline is launched at a substantial angle to the horizontal and wherein tension is applied to the pipeline, said angle being selected to allow the pipeline to form a catenary curve between the launch point and the sea bed for a given applied tension.

5. The method of claim 4, wherein said tension is controlled to ensure that the bending of the pipeline at the point where it meets the sea bed is within the elastic yield limit of the pipe material.

6. The method of claim 1, wherein the pipeline is launched via an adjustable-angle ramp.

7. The method of claim 6, wherein said pipeline is straightened by straightening means mounted on said variable angle ramp after being diverted downwardly to its final launch angle.

8. The method of claim 1, wherein said upward bending of the pipeline diverts the pipeline about a horizontal axis through substantially 180° prior to being launched.

9. The method of claim 8, wherein the pipeline is bent about a circular sheave defining an arcuate pipeline bending path.

10. The method of claim 1, wherein the pipeline is launched from the stern of the vessel.

11. The method of claim 1, wherein the pipeline is launched through a moon-pool.

12. The method of claim 1, wherein tension is applied to said pipeline by tensioning means prior to being diverted upwardly.

13. A vessel for use in laying an underwater pipeline, the vessel including a deck area, means on the deck area for aligning pipe sections along a substantially horizontal axis and connecting said pipe sections together to form a pipeline, and means for bending the pipeline to cause it to pass from said horizontal axis to a launch axis having a substantial inclination to the horizontal; in which said bending means is adapted to bend said pipeline upwardly along a substantially arcuate path and subsequently to bend said pipeline downwardly to a final launch angle.

14. The vessel of claim 13, wherein said pipeline bending means is adapted to plastically bend the pipeline about a substantially arcuate path in a substantially vertical plane, and in which straightening means are provided downstream of said bending means for removing the bend in the pipeline.

15. The vessel of claim 14, wherein said pipeline bending means is adapted to bend the pipeline through an angle greater than 90°.

16. The vessel of claim 13, further including means for applying tension to said pipeline.

17. The vessel of claim 16, further including means for controlling said tension to ensure that the bending of the pipeline at the point where it meets the sea bed is within the elastic yield limit of the pipe material.

18. The vessel of claim 13, in which said bending means comprises first bending means for diverting the pipeline upwardly along said substantially arcuate path and second bending means for subsequently diverting the pipeline downwardly to said final launch angle.

19. The vessel of claim 18, wherein said second bending means comprises an adjustable-angle ramp.

20. The vessel of claim 19, wherein said adjustable-angle ramp is located for launching the pipeline from the stern of the vessel.

21. The vessel of claim 19, wherein said adjustable-angle ramp is located for launching the pipeline through a moon-pool.

22. The vessel of claim 19, wherein said straightening means is mounted on said variable angle ramp for straightening said pipeline after it has been diverted downwardly to its final launch angle.

23. The vessel of claim 18, further including tensioning means located upstream of said first bending means in the direction of pipeline travel.

24. The vessel of claim 18, wherein said first bending means is adapted to divert the pipeline about a horizontal axis through substantially 180° prior to being launched.

25. The vessel of claim 24, in which said first bending means comprises a sheave mounted above the deck area.

* * * * *